United States Patent [19]
Groves et al.

[11] Patent Number: 5,701,651
[45] Date of Patent: Dec. 30, 1997

[54] COMPOSITE STRINGER AND SKIN PANEL ASSEMBLY MACHINE

[75] Inventors: Oliver J. Groves, Freeland; Donald A. Jensen, Kent; Thomas S. Nelson, Renton; Joel M. Thomas, Kent, all of Wash.

[73] Assignee: The Boeing Company, Seattle, Wash.

[21] Appl. No.: 451,763

[22] Filed: May 26, 1995

[51] Int. Cl.$^6$ ...................................................... B23Q 1/08
[52] U.S. Cl. ........................... 29/281.5; 29/468; 269/71; 269/37; 269/910
[58] Field of Search ................ 29/251, 252, 281.1, 29/281.5, 468; 269/71, 309, 37, 910

[56] References Cited

U.S. PATENT DOCUMENTS

| | | | |
|---|---|---|---|
| 1,834,294 | 12/1931 | Spahn | 269/71 |
| 2,596,401 | 5/1952 | Hines | 269/71 |
| 3,283,699 | 11/1966 | Hawkins | 29/251 |
| 4,492,016 | 1/1985 | Smets et al. | 29/281.5 |
| 4,565,595 | 1/1986 | Whitener. | |
| 4,599,034 | 7/1986 | Kennedy et al. | 269/71 |
| 4,662,587 | 5/1987 | Whitener. | |
| 5,415,384 | 5/1995 | Obrist et al. | 269/309 |

*Primary Examiner*—Robert C. Watson
*Attorney, Agent, or Firm*—Christensen O'Connor Johnson & Kindness PLLC

[57] ABSTRACT

A machine (20) for positioning a jig (22) relative to another surface (28) is disclosed. The machine includes a truss (24) for supporting the jig. A support stand (26) connected to each end of the truss supports the truss at a first position spaced apart from the surface, and at a second position adjacent the surface. Each support stand includes a first linear movement assembly (72) and (74) for respectively acting upon the first and second ends of the truss to move the truss from the first position to the second position, and from the second position to the first position. Each support stand additionally includes a rotating assembly (48) for rotating the truss along an axis substantially passing through both ends of the truss.

10 Claims, 12 Drawing Sheets

COMPOSITE STRINGER AND SKIN PANEL ASSEMBLY MACHINE

FIELD OF THE INVENTION

The present invention relates to assembly machines, and more particularly to machines for assembling composite parts.

BACKGROUND OF THE INVENTION

The use of composite materials in the manufacture of aircraft and other lightweight structures has increased steadily since the introduction of such materials. Composite materials have a high strength-to-weight ratio and stiffness, making them attractive in the design of lightweight structures. One drawback to using composite materials in the past has been high fabrication costs. It has been difficult to produce composite parts for the same cost as comparable metal parts. The cost differential is especially notable in large-scale parts or parts having abrupt or complex contours.

One of the largest contributors to composite structure costs is the amount of manual labor required during fabrication to create and precisely position composite parts that are to be joined together prior to a curing step. In this regard, uncured composite parts have a very high tack, making it difficult to reposition and align composite parts once they have made contact with another composite part that is uncured. Additionally, after a composite part has been assembled to another uncured composite part, the assembly is cured in an autoclave. The curing process applies heat to the assembly, resulting in thermal expansion and material shrinkage, which compounds any alignment errors between the different parts of the assembly.

Because of their size, alignment errors are particularly undesirable when assembling cured composite stringers to uncured composite skin panels. In the past, cured composite stringers have been positioned one at a time atop uncured composite skin panels. Because each stringer is typically many feet long, minor misalignments can be compounded many times.

An alternative to maneuvering the stringers is maneuvering the uncured composite skin panels. Unfortunately, skin panels are generally hundreds of feet in area or more, and are usually formed on a lay-up mandrel weighing thousands of pounds. Manually maneuvering such a large, heavy object is difficult to accomplish with precision, and can result in injuries to personnel.

Finally, extensive manual handling during fabrication increases the likelihood of foreign materials being introduced into completed composite structures. Incorrect placement of parts prior to curing and foreign material contamination are large contributors to composite structure rejection rates. Thus, a need exists for methods and apparatus that reduce the amount of manual labor required for assembling parts that include uncured composite materials, especially in the fabrication of large structures. The present invention is directed to meeting this need.

SUMMARY OF THE INVENTION

In accordance with the present invention a method and apparatus for accurately assembling composite parts, such as stringers and skin panels, is provided. Apparatus formed in accordance with this invention comprises a machine that includes a locating jig for holding one or more composite parts, such as a plurality of stringers, and a lay up mandrel for holding another composite part, such as a skin panel. The machine includes a truss for supporting the jig. Each end of the truss, in turn, is supported by a trunnion, e.g., a support stand. The trunnions suspend the truss and thus, the jig, a spaced distance above a surface, defined by the mandrel. Vertical linear movement assemblies included in each trunnion raise and lower the truss and, thus, the jig, with respect to the surface. A rotating assembly, also included in each of the trunnions, is used to rotate the truss about a horizontal axis that passes through the ends of the truss. In operation, the machine accurately and repeatably aligns the jig with respect to the surface defined by the mandrel. Hence, the composite parts, respectively held by the jig and the mandrel, are accurately and repeatably aligned with one another. The use of the machine eliminates a substantial amount of labor required for manually aligning the jig with respect to the mandrel surface, and the errors inherent in manual alignment.

In accordance with further aspects of this invention, the machine includes a control station connected to the vertical linear movement and rotating assemblies of each support stand. The control station is operated to cause the vertical linear movement and rotating assemblies of each trunnion to respectively vertically move and rotate the ends of the truss substantially in unison with one another.

In accordance with the other aspects of this invention, the trunnions each include a horizontal linear movement assembly for moving the truss along a horizontal path of travel that is generally parallel to the rotational axis that passes through the ends of the truss. The horizontal linear movement assembly provides the capability to adjust the horizontal position of the truss, and to quickly uncouple the truss.

In accordance with yet other aspects of this invention, each rotating assembly includes a shaft. The shaft of each rotating assembly is connected to one end of the truss, and to a motor such that operation of the motor causes the truss to rotate.

The present invention also provides a method of aligning a first composite part relative to a second composite part. The method includes: supporting a jig on a truss, with the first composite part supported on the jig, and the second composite part supported on a mandrel; positioning the mandrel and the jig a spaced apart distance from one another; rotating the truss until the jig faces the mandrel; moving the truss towards the mandrel until the jig is adjacent the mandrel; adjusting the position of the mandrel to align the mandrel with the jig and thereby align the first composite part with the second composite part; and moving the truss toward the mandrel until the first and second parts contact one another.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
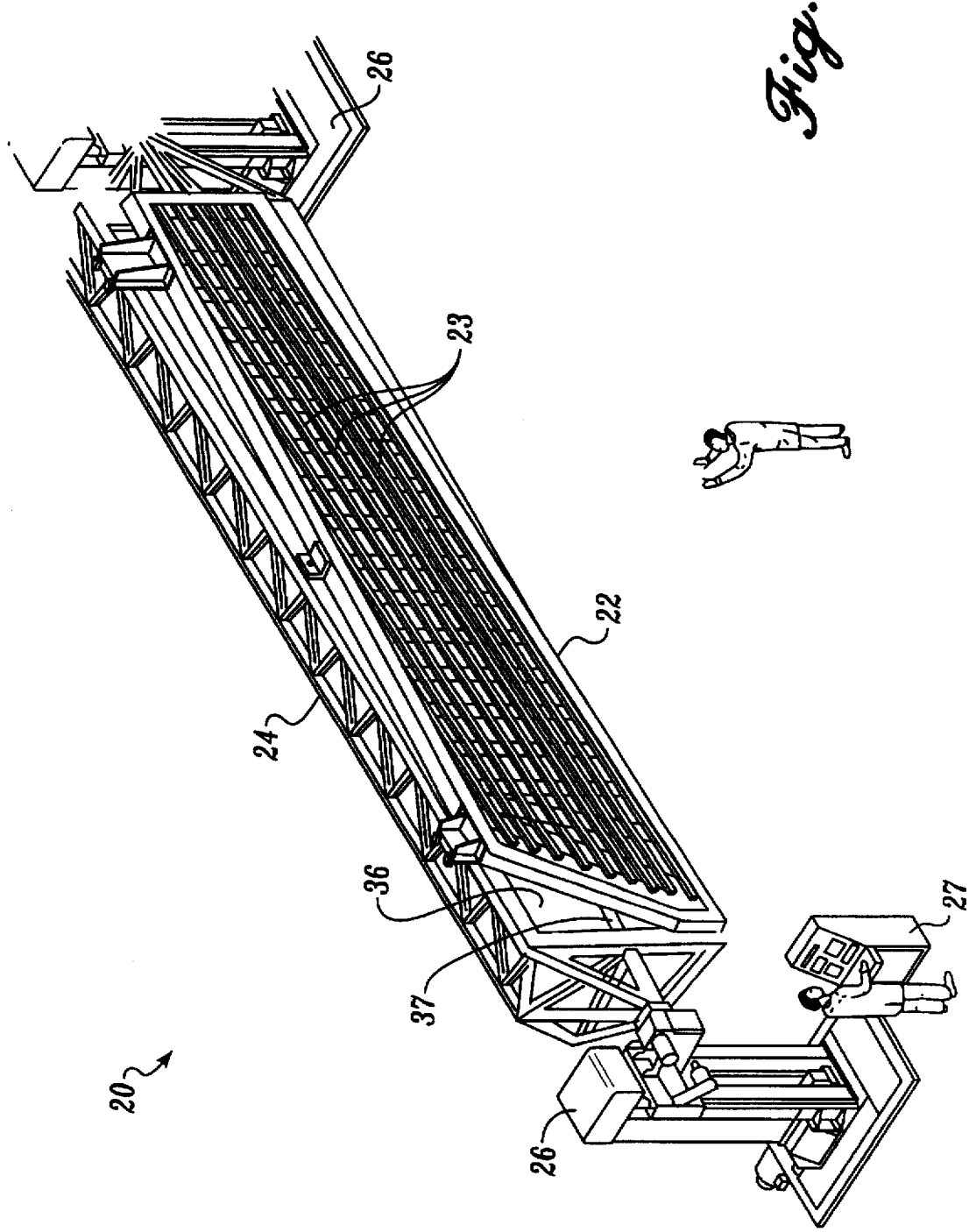
FIG. 1 is a perspective view of a machine formed in accordance with the present invention for supporting a composite stringer locating jig.

FIG. 1 illustrates a machine, indicated generally by reference numeral 20, formed in accordance with the present invention, for positioning a locating jig 22 relative to a generally horizontal surface. The machine 20 includes a truss 24, rotatably supported at opposite ends by a support stand, or trunnion 26, and a control station 27 connected to each of the trunnions for controlling operation of the machine. The jig 22 is releasably connected to one side of the truss 24. The jig 22 is generally planar in configuration, being formed of an elongate peripheral frame and cross braces. This jig is designed to support a plurality of parallel oriented, elongate composite parts, such as a plurality of composite stringers.

As will be better understood from the following description, when the jig 22 is connected to the truss 24, personnel affix elongate, uncured composite parts 23, such as stringers, to the jig. The jig 22 holds these parts 23, while the jig is aligned with a substantially horizontal surface that supports another uncured composite part or parts, such as a skin panel (not shown in FIG. 1). When the jig is aligned with the other surface, the uncured composite parts in the jig are thereby aligned with the parts supported by the surface the jig is aligned with. The different parts can then be brought together in correct alignment for later curing in an autoclave.

As noted above, the truss 24 is rotatably supported by the trunnions 26. An advantage of the rotatable truss 24 is that the jig can be vertically oriented when composite parts are attached to the jig. This allows personnel to attach composite parts 23 to the lower portion of the jig 22, when the truss has been rotated to the position shown in FIG. 1. When personnel are ready to begin attaching composite parts to the upper portion of the jig 22, the truss 24 can be rotated 180 degrees to reverse the orientation of the jig. That is, the former lower portion of the jig 22 becomes the upper portion, and the former upper portion becomes the lower portion. In this way, personnel can readily reach all portions of the jig 22 to attach the composite parts 23.

Figure 2:
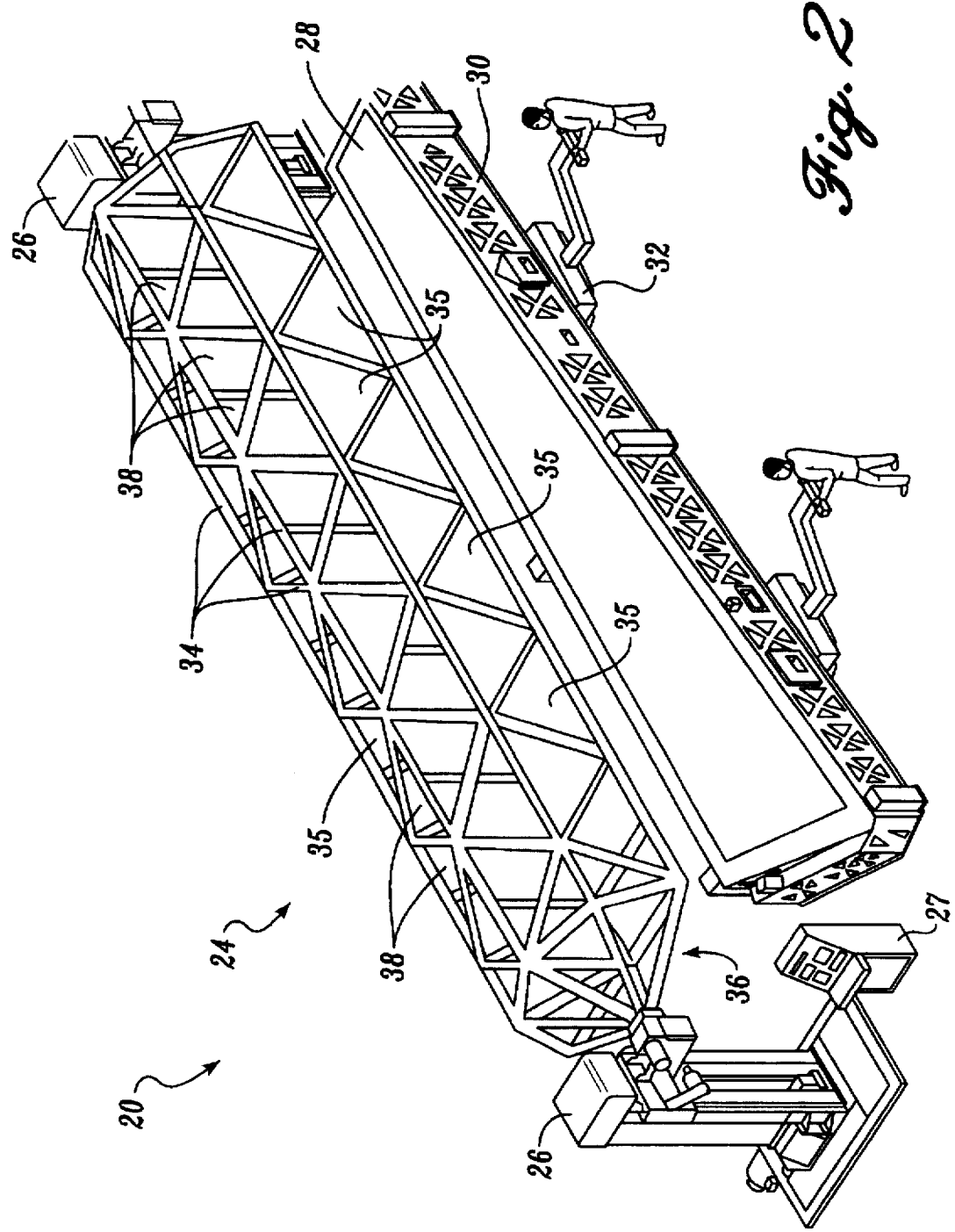
FIG. 2 is a perspective view of the machine of FIG. 1, shown with the jig removed, with a mandrel being moved to a location near the machine.

The jig 22 is aligned with another surface by the trunnions 26 rotating the truss 24 to the orientation shown in FIG. 2. Specifically, the truss 24 is rotated such that the jig 22 faces downward (the jig 22 is shown removed from the truss in FIG. 2 to clarify other features of the invention). When in this orientation, the truss is initially high enough for another uncured composite part 28, such as a skin panel, to be moved into position under the truss 24. As shown in FIG. 2, the uncured composite part 28 is supported on a mandrel 30, which was used to form the composite part.

The mandrel 30 is illustrated being moved by the use of conventional air planks 32. Personnel use the air planks 32 to move the mandrel 30 underneath the truss 24. In one actual embodiment, air planks 32 manufactured by AeroGo, Inc., of Seattle, Wash., were found suitable for practicing the present invention. When the mandrel 30 has been moved under the truss 24, the trunnions 26 lower the truss and jig 22 towards the mandrel. As the jig is lowered, alignment pins (described below) align the jig with the mandrel and, thus, the composite parts 23 on the jig with the composite part or parts 28 on the mandrel.

The truss 24 is formed from a plurality of beams 34, preferably made of an aluminum alloy, connected together to create a framework. Preferably, the beams 34 are welded together, but may be connected together by any conventional method, such as by bolts, screws, brackets, and etc. Preferably, the framework of the truss 24 includes a main body portion that is generally in the shape of a tubular octagon that has been cut in half lengthwise. The jig 22 is releasably connected to the cut-face 36 of the tubular octagon shape as shown in FIG. 1. The framework of the truss 24 defines prismatic half-conical ends that cap each end of the tubular half-octagon main body portion. The trunnions 26 are connected to the peaks of the half-conical ends.

As shown in FIG. 2, the framework has a plurality of triangular openings 35, which define planes that define the faces of the tubular half-octagon shape. Extending inwardly from the junctions between the faces of the truss framework defined by the triangular openings is further framework having rectangular openings that more or less centrally intersect at a beam 37 that longitudinally spans the cut face 36. Preferably, the rectangular openings are filled with metal panes 38 formed of an aluminum alloy to stiffen the truss 24, and prevent bending. However, the metal panes 38 are preferably not inserted into the rectangular openings along the cut face 36 of the truss 24 to conserve weight.

Figure 3:
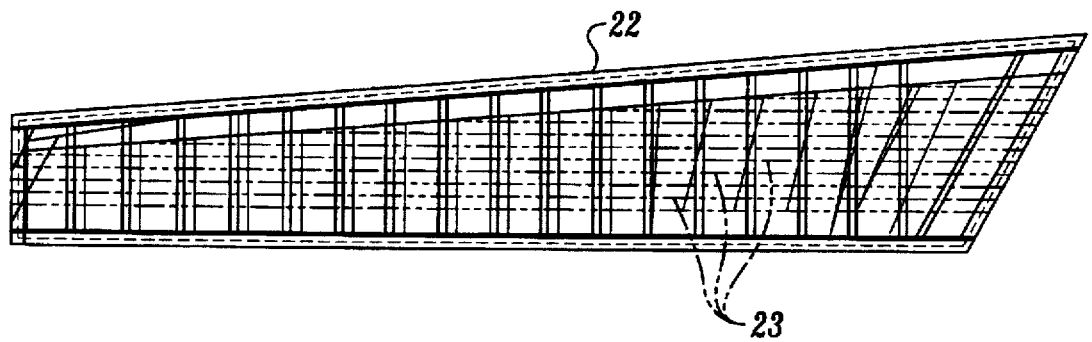
FIG. 3 is a top plan view of a locating jig in accordance with the present invention.
Figure 4:
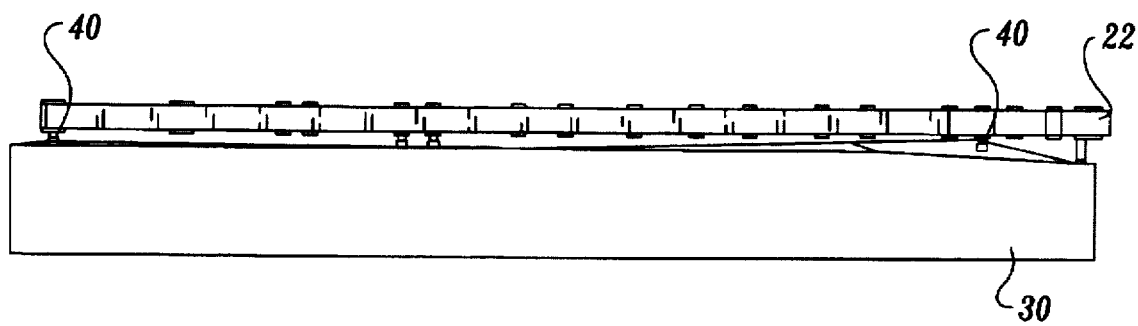
FIG. 4 is an elevational side view of the jig of FIG. 3, aligned with a mandrel in accordance with the present invention.

A top plan view of the jig 22 is illustrated schematically in FIG. 3, with composite parts 23 indicated by phantom lines. When the jig 22 is aligned with a mandrel 30, the jig is placed on top of the mandrel as indicated schematically by a side elevational view of the jig and mandrel shown in FIG. 4. To facilitate aligning the jig 22 with the mandrel 30, the jig is provided with alignment pins 40. The alignment pins 40 are received by alignment holes formed in the mandrel 30, when the jig 22 is lowered onto the mandrel.

Figure 5:
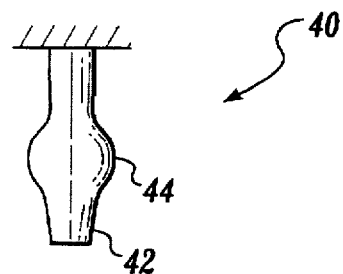
FIG. 5 is an enlarged elevation view of an alignment rod from the jig of FIG. 4.

To facilitate insertion of the alignment pins 40 into the alignment holes in the mandrel 30, the pins are tapered as illustrated in FIG. 5 and include a bulbous protrusion 44. The smaller diameter tip 42 of each pin 40 is first received in the related alignment hole. The smaller diameter tip 42 of the pins 40 facilitates initial insertion of the pins into the alignment holes when the jig 22 is lowered onto the mandrel 30. As the pins 40 are inserted further into the alignment holes, the bulbous portion 44 is received in the recess. The bulbous protrusion closely aligns the jig 22 with the mandrel 30, and prevents the jig and mandrel from binding with one another. The pins 40 easily and precisely omnidirectionally position the relatively heavy mandrel 30 and jig 22 with respect to one another because the mandrel is floating on the air planks 30.

Figure 6:
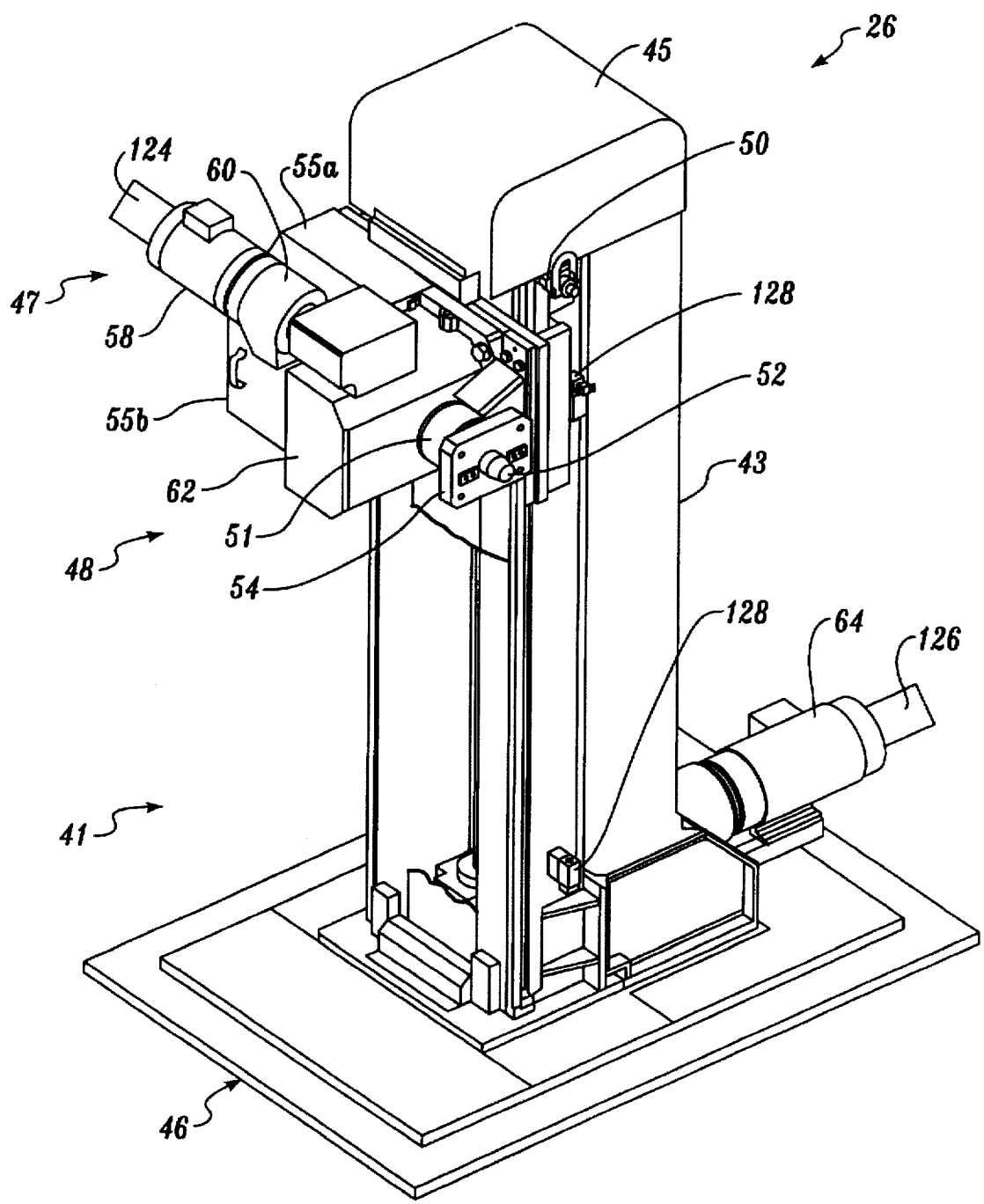
FIG. 6 is an enlarged perspective view of one of the trunnions of the machine of FIG. 1.

FIG. 6 is an enlarged perspective view of one of the trunnions 26 of the machine 20 shown in FIG. 1. The trunnion 26 includes two major functional assemblies—a vertical linear movement assembly 41 and a carriage assembly 48. The vertical linear movement assembly 41 vertically, linearly moves the truss 24. The carriage assembly 48 rotates and horizontally, linearly moves the truss 24.

The vertical linear movement assembly 41 moves the truss 24, by vertically, linearly moving the carriage assembly 48. More particularly, the carriage assembly 48 is supported by the vertical linear movement assembly 41 and, is also connected to the truss 24. Thus, vertical linear movement of the carriage assembly 48 by the vertical linear movement assembly 41 causes vertical linear movement of the truss 24.

Turning now to a more detailed description of the vertical linear movement assembly 41 and the carriage assembly 48, the vertical linear movement assembly 41 includes a tower 43, covered by a cap 45 at its upper end. The tower rises vertically from a rectangular-shaped base 46. The tower 43 supports a pair of vertical, spaced-apart rail tracks 50 (only one rail track is visible in FIG. 6). One rail track 50 is mounted on one side of the tower 43 and the other rail track is mounted on the opposite side. The side of the tower 43 between the rail tracks 50 is open. The carriage assembly 48 is slidably mounted on the rail tracks 50.

Figure 9:
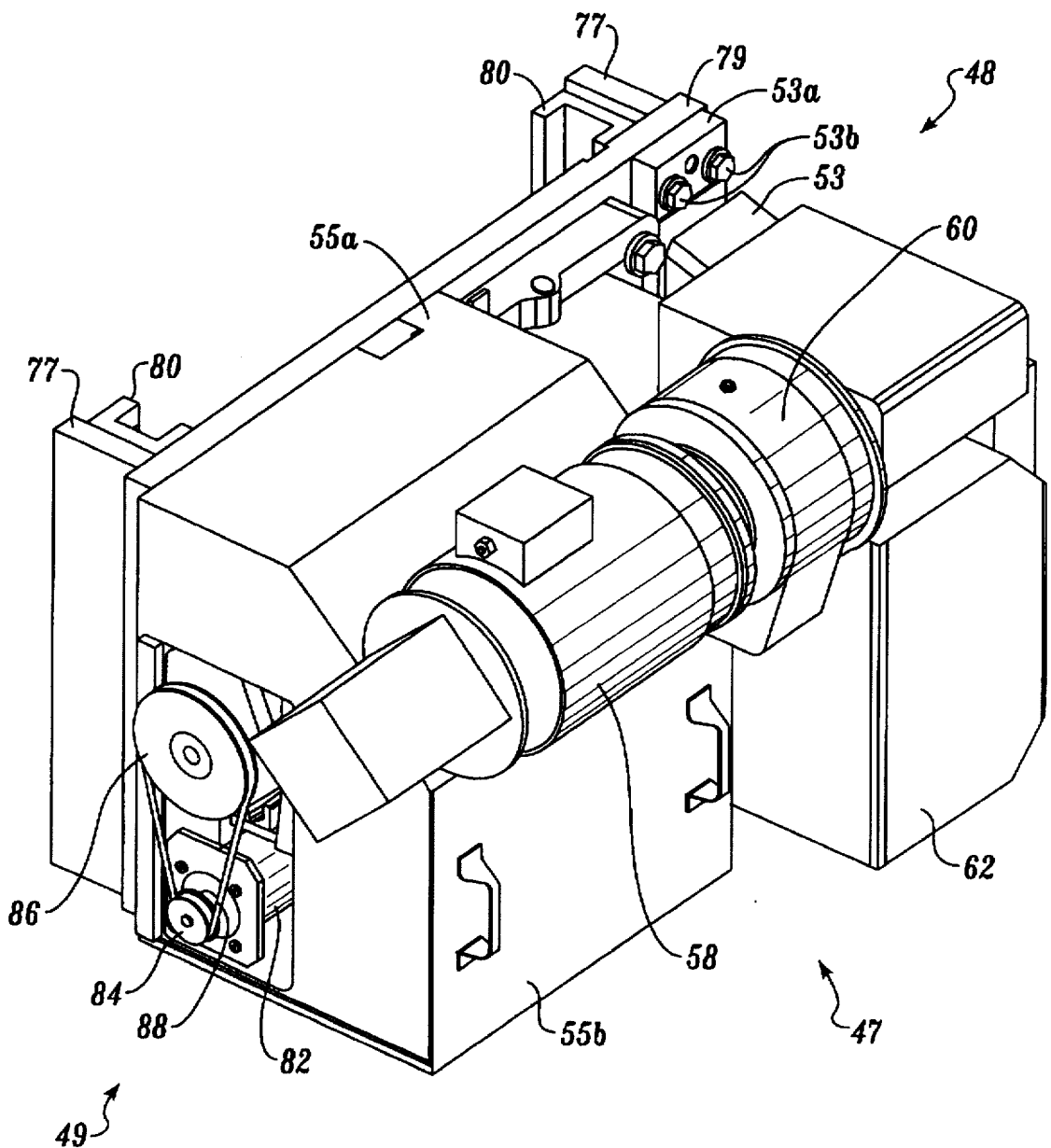
FIG. 9 is an enlarged perspective view of the carriage assembly of the trunnion of FIG. 6.

An enlarged view of the carriage assembly 48, removed from the trunnion 26, is shown in FIG. 9. The carriage assembly 48 includes a rear support plate 79, positioned between the tower 43 of the trunnion 26, and the main components of the carriage assembly. A pair of vertical plates 77 are affixed to one face of the rear support plate 79, along opposed edges of the plate. Slide units, or U-shaped brackets 80 are mounted on the facing vertical sides of the vertical plates 77. The U-shaped brackets 80 are positioned to be slidably mounted on the rail tracks 50 mounted on the tower 43. In this regard, the rail tracks 50 have vertical indentations on the sides facing the legs of the U-shaped slide brackets 80. The legs of the U-shaped slide brackets 80 include mating bearings or frictionless slides (not shown). As explained below, the vertical linear movement assembly 41, causes the carriage assembly 48 to travel vertically along the tower 43 on the rail tracks 50. In one actual embodiment, rail tracks 50, and slide units, or U-shaped slide brackets 80, manufactured by Tsubakimoto Precision Products Co., Ltd., of Osaka, Japan, were found suitable for practicing the present invention.

The carriage assembly 48 includes two major functional subassemblies—a rotating subassembly 47 and a horizontal linear movement subassembly 49, both shown best in FIGS. 6 and 9. The rotating subassembly 47 and the horizontal linear movement subassembly 49 rotate and horizontally, linearly move the truss 24, respectively, as described next.

Referring to FIG. 6, the rotating subassembly 47 includes a horizontally oriented rotatable shaft 52. The shaft lies parallel to the open side of the tower 43. Mounted on the end of the shaft 52 is a generally rectangular-shaped mounting plate 54. More specifically, the shaft 52 extends through the center of the mounting plate 54 and the mounting plate is keyed to the shaft 52. Thus, when the shaft 52 rotates, the mounting plate 54 rotates. The mounting plate 54 is used to connect the carriage assembly 48 to one end of the truss 24 (see FIGS. 1 and 2). Thus, rotation of the shaft 52 and the mounting plate 54 causes the truss 24 to rotate.

Rotation of the shaft 52 is preferably caused by an electric motor 58 mounted on the carriage assembly 48. The torque from the motor 58 is multiplied by being transmitted through a first gearbox 60, and then through a second gearbox 62 before being applied to the shaft 52. In one actual embodiment, a 3 hp electric motor, available from Lloyd Controls Inc., of Mountlake Terrace, Wash., was found suitable for practicing the present invention. In the foregoing actual embodiment, the torque from the 3 hp motor was transmitted through a 4:1 gearbox, manufactured by Indiana Power Transmission Systems, Inc. of Indianapolis, Ind., and then through a 1000:1 gearbox manufactured by Peerless.Winsmith, Inc. of Springville, N.Y. Thus, the gearboxes 60 and 62 increased the torque of the motor by a factor of approximately 4,000.

Figure 12:
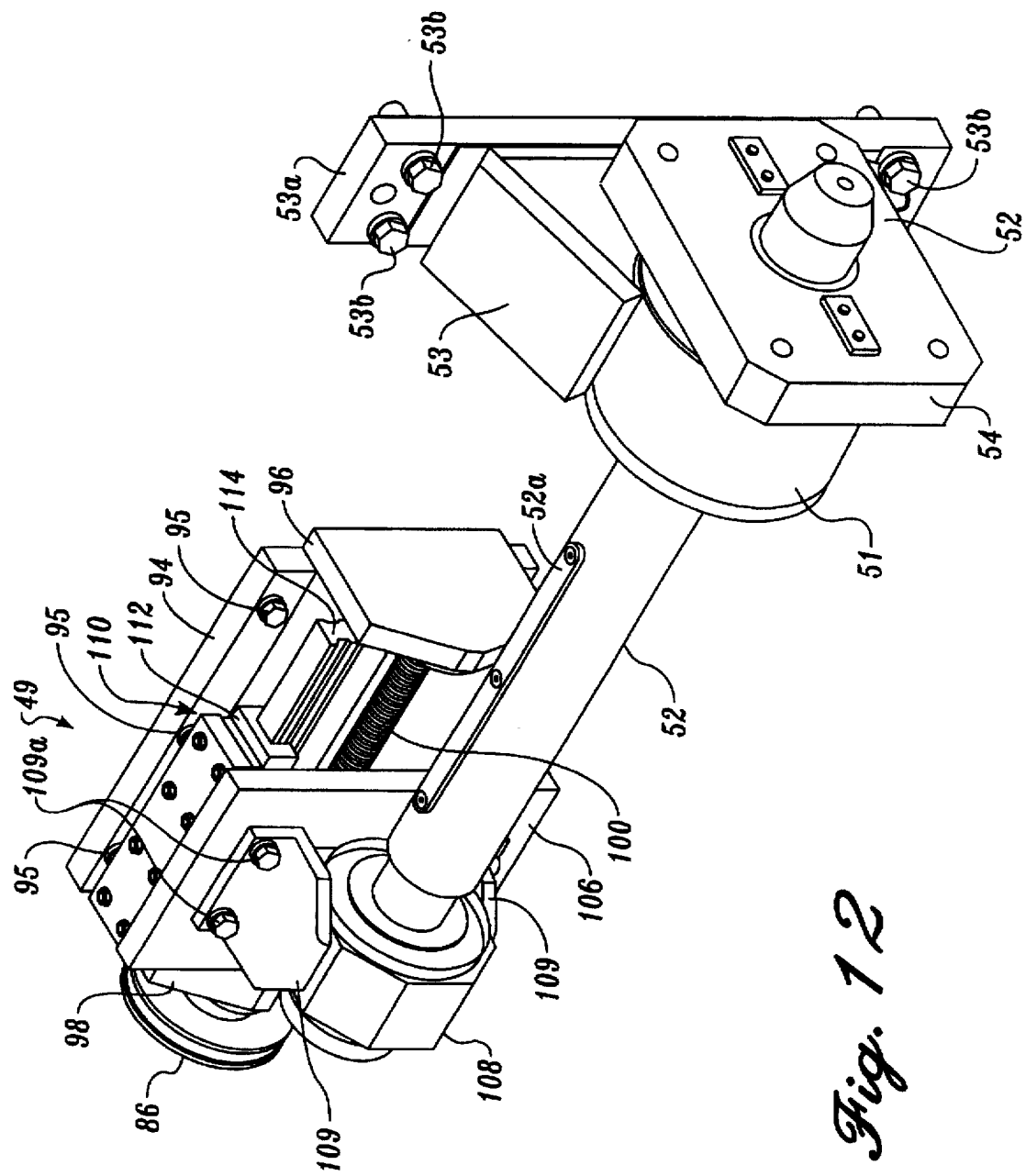
FIGS. 12 and 13 are each perspective views of a portion of the carriage assembly of FIG. 9.

The shaft 52 is shown in FIG. 12 separate from the motor 58, gearbox 60, and other nearby items. The end of the shaft 52 that is connected to the truss 24, is supported in an annular bearing housing 51. The upper side of the bearing housing 51 is attached by welding or in some other suitable manner, as described below, to one end of a first diagonal plate 53 that extends diagonally upward, and away from the bearing housing. An identical diagonal plate 53 (not visible) is attached to the lower side of the bearing housing 51, and extends diagonally downward, in a way that mirrors the upper plate. The opposite ends of both of these plates 53 are attached to a vertically disposed, rectangular plate 53a. Referring to FIG. 9, the vertical plate 53a is attached to one side of the face of the rear support plate 79 of the carriage assembly 48 opposite the face that supports the U-shaped slide brackets 80 by bolts 53b. Thus, diagonal plates 53 and the rectangular plate 53a serve to support the bearing housing 51 from the rear support plate 79 of the carriage assembly 48 in a cantilevered manner.

As noted above, the diagonal plates 53 and the rectangular plate 53a may be connected together and to the annular bearing housing 51 by any conventional method known in the art, such as by bolts, rivets, welding, etc. The preferred method of connecting the diagonal plates 53 to the bearing housing 51 and to rectangular plate 53a is by welding.

The bearing housing 51 permits the shaft 52 to axially rotate. Additionally, as will be explained in greater detail below, the bearing housing 51 is constructed in a way that permits the shaft to longitudinally slide back and forth. Longitudinal movement of the shaft 52 is controlled by the horizontal linear movement subassembly 49 of the carriage assembly 48.

Returning to FIG. 12, the opposite end of the shaft 52 is supported in a second bearing housing 108. The second bearing housing 108 only permits the shaft 52 to axially rotate therein, and does not permit the shaft to axially slide back and forth as the first bearing housing 51. As described more fully below, the second bearing housing 108 is moved horizontally back and forth by the horizontal linear movement subassembly 49. More specifically, the second bearing housing 108 is attached to one face of a rectangularly shaped vertical plate 106 by a pair of L-shaped brackets 109. One bracket is located above the second bearing housing 108 and the other is located below. One leg of each bracket 109 is attached to the bearing housing 108 in any suitable way, by welding, for example. The other leg of each bracket 109 is attached to the vertical plate 106 in any suitable way, such as by bolts 109a, for example. The vertical plate 106 is movable back and forth along an axis that lies parallel to the shaft 52 by the horizontal linear movement subassembly 49 in the manner described below. Since the shaft 52 is not slidably mounted in the second bearing housing 108, as the vertical plate 106 and the second bearing housing are horizontally moved back and forth, the shaft 52 moves horizontally back and forth.

Figure 11:
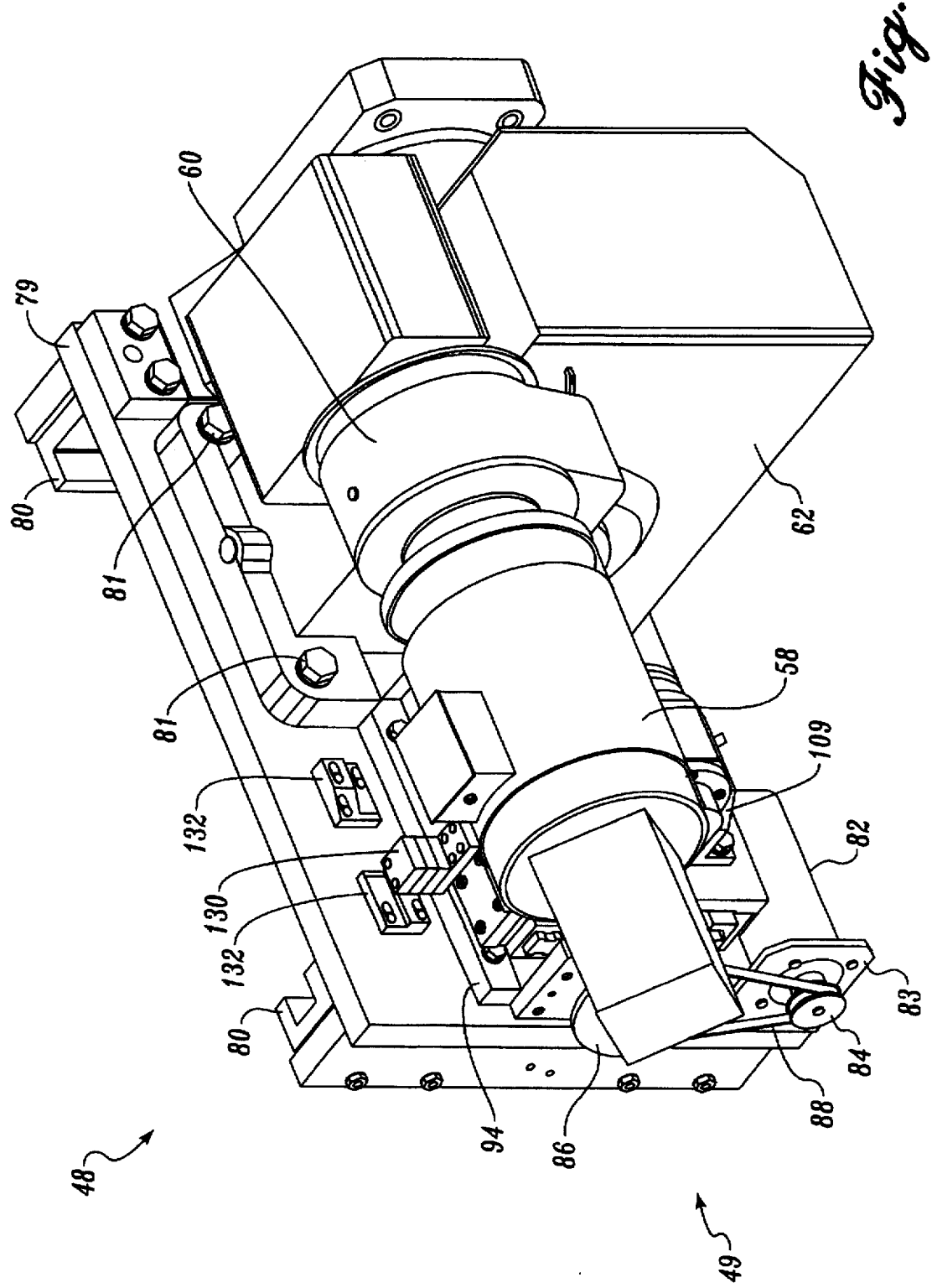
FIG. 11 is a perspective view of the carriage assembly of FIG. 9, with the access cover panels removed.

Referring to FIG. 9 and 11, the horizontal linear movement subassembly 49 includes an electric motor 82 mounted underneath and behind access panels 55a and 55b of the carriage assembly 48. More specifically, the motor 82 is supported by an L-shaped bracket 83 having one leg attached to the outer face of the rear support plate 79. The other leg of the L-shape bracket 83 supports the motor 82 such that the shaft of the motor is horizontally oriented. Mounted on the shaft of the motor 82 is a small pulley 84, which is coupled to a larger pulley 86 by a belt 88. In one actual embodiment, an electric motor of approximately ¼ hp, available from Pacific Motion Group of Fall City, Wash., was found suitable for practicing the present invention, with the pulleys sized to provide a mechanical advantage of approximately 3:1.

Figure 13:
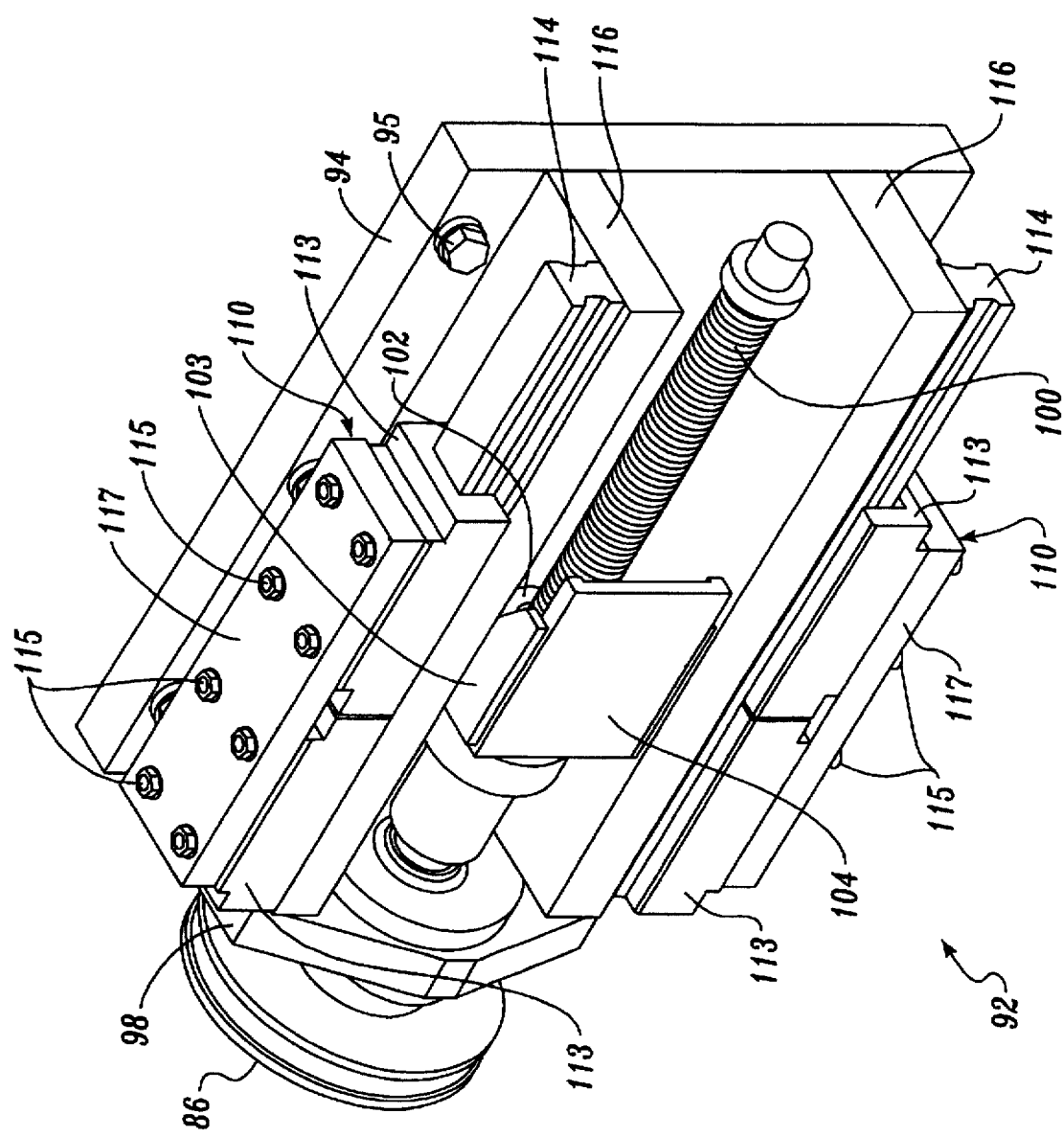

As best shown in FIGS. 11, 12 and 13, the horizontal linear movement subassembly 49 includes a rectangularly shaped back support plate 94, which is attached to the outer face of the rear support plate 79 of the carriage assembly 48 by bolts 95.

A pair of ball screw support plates 96 and 98 extend transversely outwardly from the vertical edges of the back support plate 94. One of the ball screw support plates 98 lies above the electric motor 82. The ball screw support plates 96 and 98 each rotatably support opposite ends of a horizontally disposed screw 100 of a ball screw mechanism. The end of the screw 100 is rotatably supported by the ball screw support plate 98 that overlies the motor 82 and passes through that ball screw support plate. Mounted on the outwardly extending end of the screw 100 is the larger pulley 86. Thus, energization of the electric motor 82 causes the horizontally disposed screw 100 to rotate.

The horizontally disposed screw 100 includes a helical groove, formed along its length. As shown in FIG. 13, the nut or ball 102 of the ball screw mechanism is threaded onto the horizontally disposed screw 100. Affixed in any suitable way, such as by welding, to the ball 102 are a pair of spaced apart, horizontally oriented, outwardly extending support plates 103. Affixed to and extending between the support plates 103 is a vertically oriented attachment plate 104. As a result, when the horizontal screw 100 is rotated along its axis, the ball 102 and the attachment plate 104 move horizontally along the length of the screw.

The attachment plate 104 is attached to the rear surface of the previously described vertically disposed, rectangular-shaped plate 106. As also previously described, the vertical plate 106 supports the second bearing housing 108. As a result, when the horizontally disposed screw 100 is rotated, the vertical plate 106 is horizontally moved. As the vertical plate is horizontally moved, the second bearing housing 108 is also horizontally moved since the second bearing housing is mounted on the vertical plate. As a result, the shaft 52 is moved in an axial direction. As previously described, the first bearing housing 51 remains fixed in place. Rather than moving, the first bearing housing 51 is constructed to permit the shaft 52 to axially slide therethrough.

As shown in FIGS. 12 and 13, the horizontal linear movement subassembly 49 includes slide bracket support assemblies 110. The slide bracket support assemblies include a pair of vertically spaced apart plates 116, one located above and the other below the screw 100 of the ball screw mechanism. The plates 116 extend between and are attached to the ball screw support plates 96 and 98. Further, the plates are affixed to and supported by the back support plate 94. Mounted on top of the upper plate 116 and on the bottom of the lower plate 116 is a rail track 114. The longitudinal axes of the rail tracks 114 lie parallel to the longitudinal axis of the screw 100.

Mounted on each of the rail tracks 114 is a pair of slide units in the form of U-shaped slide brackets 113. The rail tracks 114 include indentations on the sides facing the legs of the U-shaped slide bracket 113. The legs of the slide brackets 113 include mating beatings or frictionless slides (not shown). In one actual embodiment, rail tracks 114, and slide units (i.e., U-shaped slide brackets 113), manufactured by Tsubakimoto Precision Products Co., Ltd., of Osaka, Japan, were found suitable for practicing the present invention.

Attached to each pair of adjacent U-shaped brackets 113 by bolts 115 or any other suitable attachment media are plates 117. The plates 117 and, if desired, the U-shaped brackets 113 are affixed to the vertical plate 106 that supports the second bearing housing 108. Thus, the slide bracket support assemblies 110 support the second bearing housing and the shaft 52.

Referring to FIGS. 9 and 11, the motor 58 that rotates the truss 24 is supported by the first gearbox 60. The first gearbox 60 is supported by the second gearbox 62 and the second gearbox is supported by the rear support plate 79. Preferably, the second gearbox 62 is attached to the rear support plate 79 by bolts 81. The shaft 52 slidably passes through the second gearbox 62 and is coupled thereto by an elongate spline 52a. See FIG. 12. As a result, when the motor 58 is energized, the shaft 52 is rotated.

Turning now to a description of the vertical linear movement assembly 41. As noted above, the vertical linear movement assembly 41 causes the carriage assembly 48 to travel vertically along the tower 43 on the rail tracks 50. The vertical movement of the carriage assembly 48 along the rail tracks 50 is powered by a motor 64 mounted to the base 46 of the tower 43. As will be better understood from the following detailed description, torque generated by the motor 64 is transmitted through a gearbox and a right angle drive to a vertically oriented screw 74 of a ball screw mechanism mounted in the tower 43. The ball of the ball screw mechanism is affixed to the carriage assembly 48. As a result, as the screw 74 is rotated, the carriage assembly is raised or lowered, depending on the direction of screw rotation. Preferably, the motor 64 is a conventional electric motor. In one actual embodiment, a 10 hp electric motor, available from Lloyd Controls Inc., of Mountlake Terrace, Wash., was found suitable for practicing the present invention.

Figure 14:
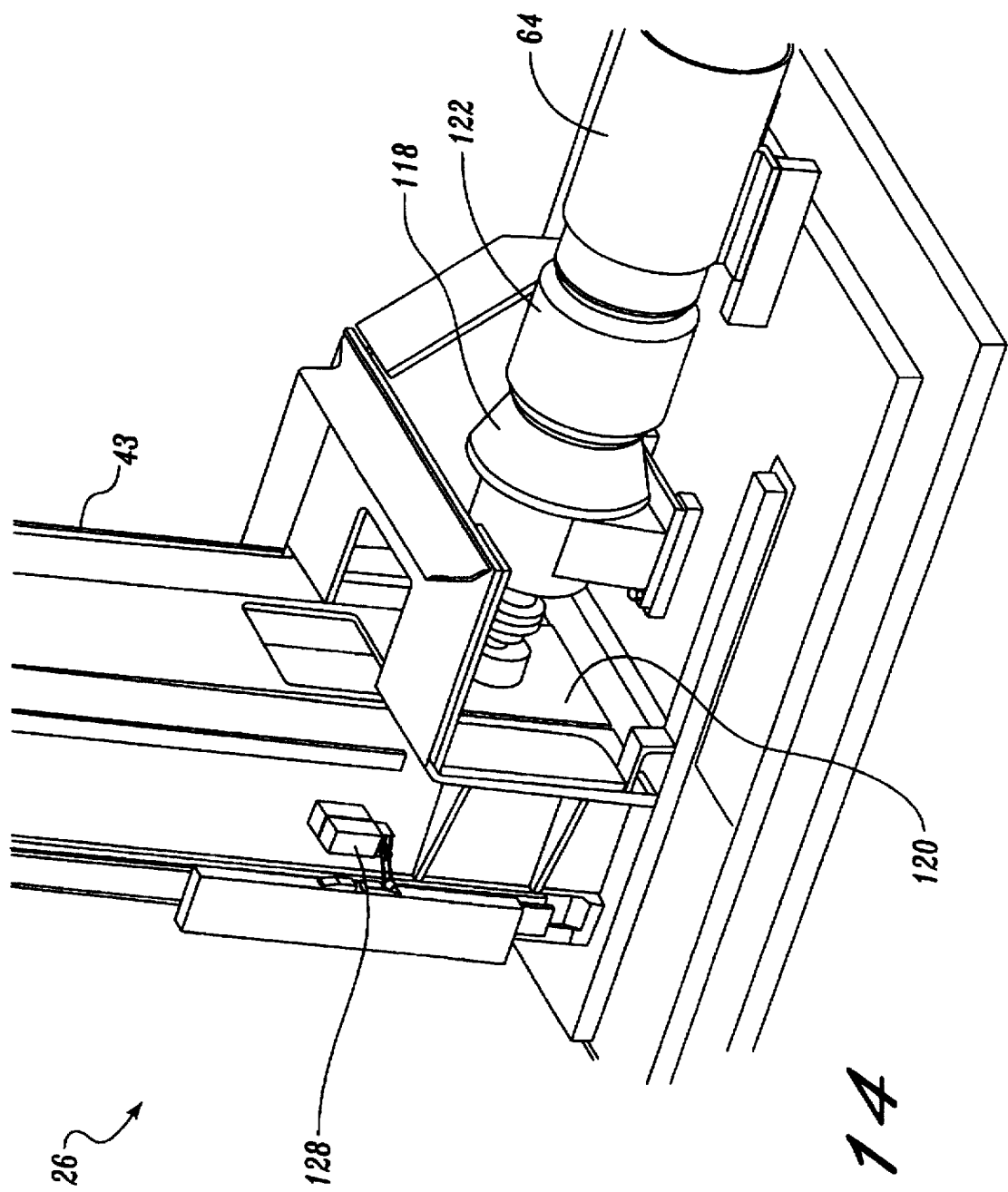
FIG. 14 is an enlarged perspective view of the base of the trunnion of FIG. 6.

As shown in FIG. 14, the motor 64 that rotates the vertically oriented screw 74 of the ball screw mechanism is connected to the screw through first and second gearboxes 118 and 120, both of which increase the torque produced by the motor. The first gearbox 118 connects the motor 64 to the second gearbox 120. Preferably, the first gearbox 120 is an in-line-type of gearbox, such as a helical gearbox. In one actual embodiment, a helical gearbox having a ratio of approximately 6.2:1, and manufactured by and manufactured by Hub City, of Aberdeen, S. Dak., was found suitable for practicing the present invention.

The second gearbox 120 is located at the base of the tower 43 of the trunnion 26. The second gearbox 120 is a right angle gearbox that translates the horizontal torque generated by the motor to vertical torque. One suitable type of such a gearbox is a bevel gear screw jack type of gearbox. In one actual embodiment of the present invention, a bevel gear screw jack having a ratio of approximately 2.69:1, and manufactured by Joyce/Dayton Corp. of Dayton, Ohio, was found to be suitable. Preferably, a brake 122 is positioned between the first line gearbox 118 and the motor 64. The brake is included to ensure that when the motor 64 is stopped, the vertical ball screw 74 stops nearly simultaneously. As a result, movement of the carriage assembly 48 is also stopped, nearly simultaneously, resulting in precise positioning control. The lower end of the vertically oriented screw 74 is affixed to and supported by the vertically oriented output shaft of the second gearbox 120.

Figure 7:
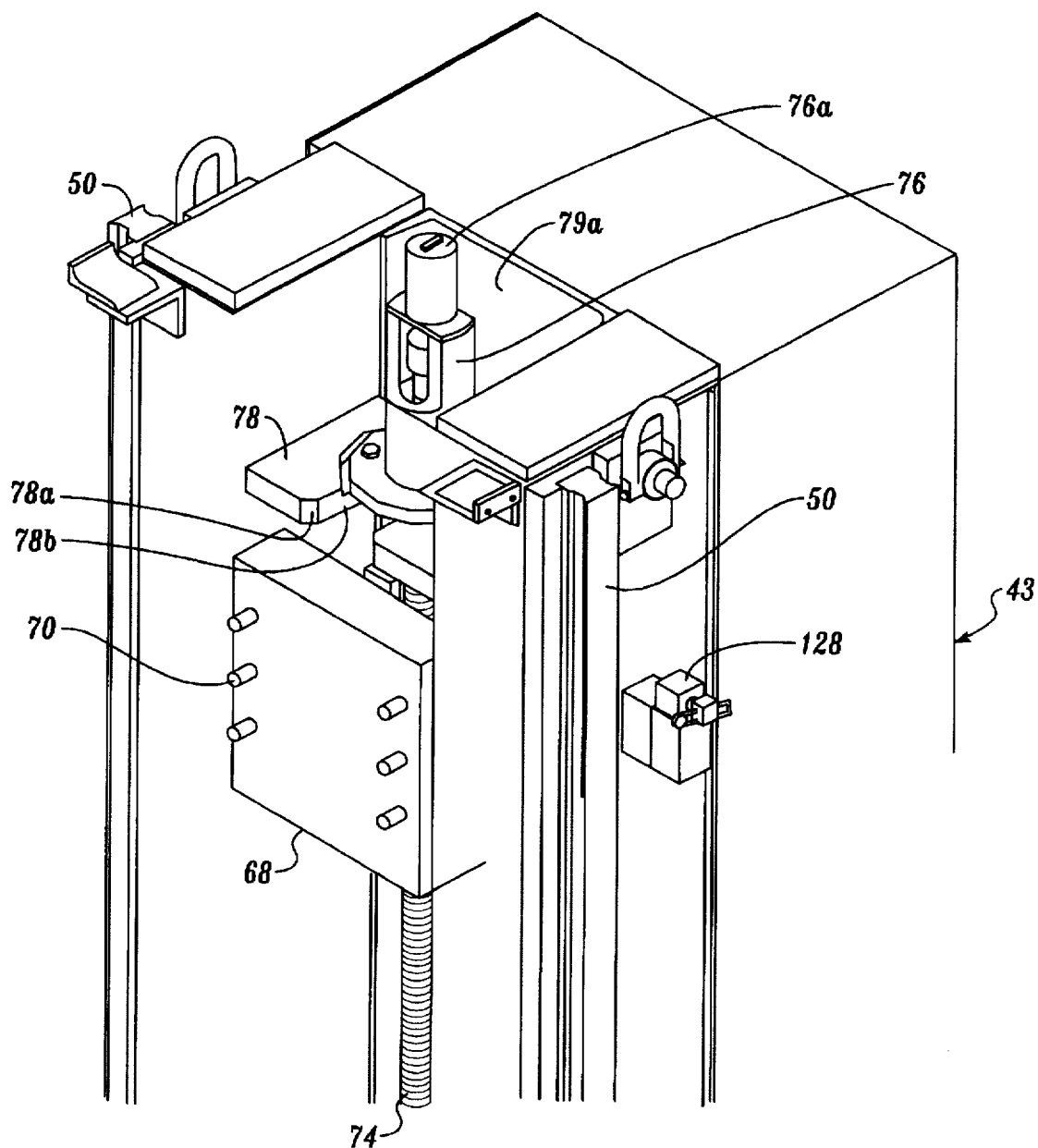
FIGS. 7 and 8 are enlarged perspective views of the upper portion of the trunnion of FIG. 6, with the cap and carriage assembly removed from the trunnion.
Figure 8:
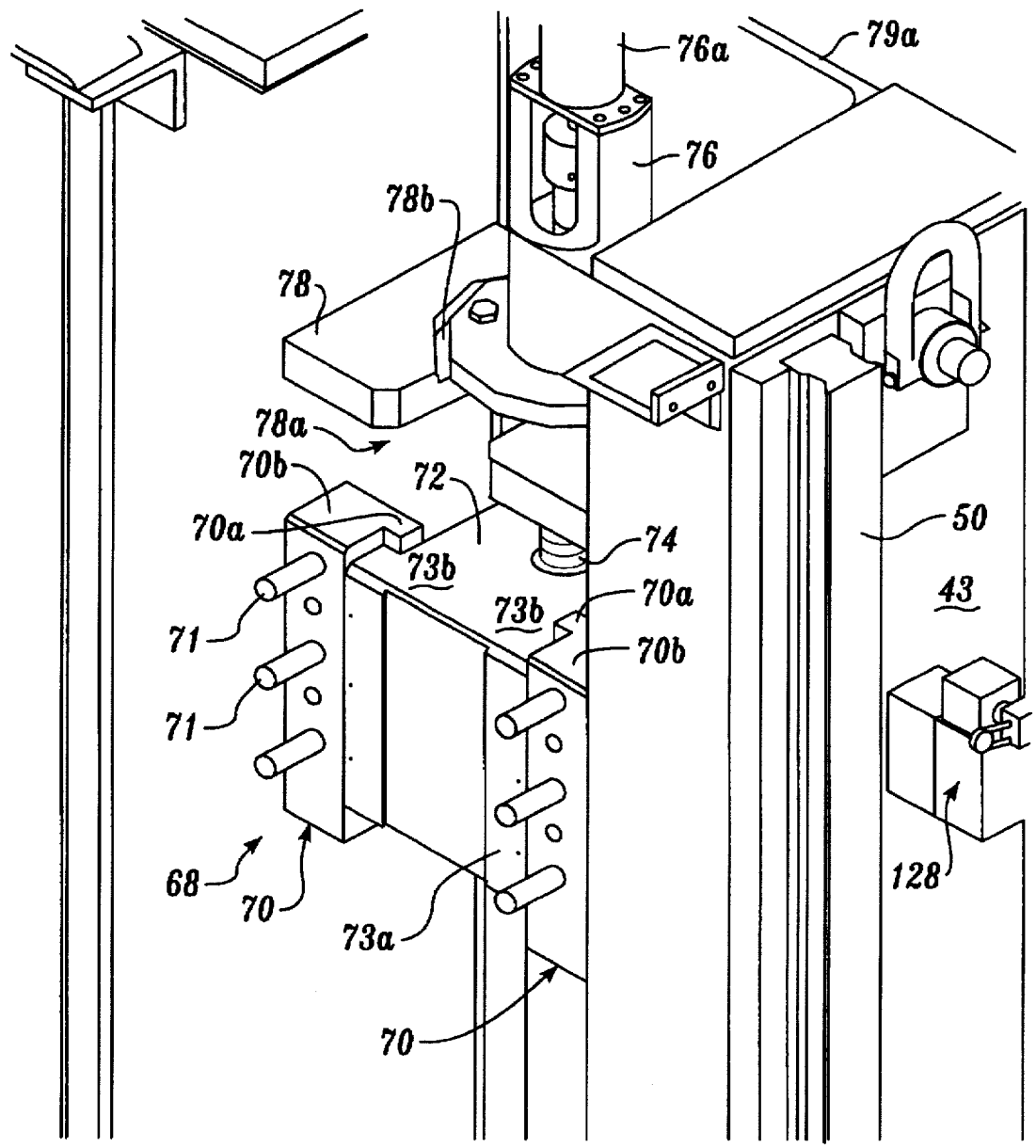

FIGS. 7 and 8 illustrate the mechanism for supporting the upper end of the vertically oriented screw 74. Specifically, affixed to a vertically oriented U-shaped channel 79a located inside of the walls of the tower 43, near the upper end thereof, is a plate 78. The plate includes a generally U-shaped aperture 78a that has a flange 78b located along its lower periphery. Mounted atop the flange 78b of the plate 78 is the flange of an elongate, vertically oriented bearing housing 76. The vertically oriented bearing housing 76 forms an end cap for rotatably supporting the upper end of the vertically oriented screw 74 of the ball screw mechanism.

Extending coaxially from the upper end of the bearing housing 76 is a resolver 76a. The resolver 76a transmits electrical pulses when the vertically oriented screw 74 is rotated. As will be explained in more detail below, the electrical pulses are transmitted to the control station 27, which counts the electrical pulses to determine the vertical position of the carriage assembly 48 along the rail tracks 50 of the tower 43.

As shown best in FIG. 8, mounted on the vertically oriented screw 74 is the ball nut housing 72 of the ball screw mechanism. The ball nut housing 72 is relatively large. One face 73a of the ball nut housing 72 is flat and lies in a vertical plane generally parallel to the open side of the tower 43. Rectangular flanges 73b extend outward from each opposite vertical side of the face 73a of the ball nut housing 72. The front of the flanges 73b lie in the same vertical plane as the face 73a of the ball nut housing 72. As shown in FIG. 7, mounted on the flat face 73 of the ball nut housing 72 is a carriage attachment assembly 68. The carriage attachment assembly 68 is attached to the rear or back side of the rear support plate 79. Since the rear support plate 79 supports the carriage assembly 48, the ball nut housing 72 of the ball screw mechanism supports the carriage assembly via the carriage attachment assembly 68.

The carriage attachment assembly 68 includes a face plate 69, and side support members 70 as shown in FIGS. 7 and 8. FIG. 8 shows the carriage attachment assembly 68 with the face plate 69 removed to show the side support members 70 behind the face plate. The face plate 69 is formed generally in the shape of an upper case letter "L". The vertical leg of the L-shape forms a vertical front face 69a for the face plate. The horizontal leg of the L-shape extends rearward from the top of the front face 69 towards the vertically oriented screw 74 to form a lip 69b extending over the top of the ball nut housing 72.

The side support members 70 of the carriage attachment assembly 68 are also formed generally in the shape of an upper case letter "L". The side support members 70 are positioned on opposite vertical sides of the ball nut housing 72. One flange 73b of the ball nut housing 72 fits in the vertex defined between the two legs of the L-shape of each side support member 70. The rear leg 70a of each side support member is positioned behind its corresponding flange 73b of the ball nut housing 72, so that the rear leg lies in a vertical plane generally parallel to the open side of the tower 43. The other leg 70b extends transversely therefrom to the face plate 69 of the carriage attachment assembly 68.

A plurality of bolts 71 extend through the transverse leg 70b of each side support member 70 and through the face plate 69. The bolts 71 extend through the face plate 69 and fasten to the rear support plate 79 of the carriage assembly 48.

The ball nut housing 72 is vertically slidable between the side support members 70 of the carriage attachment assembly 68. Gravity causes the carriage attachment assembly 68 to slide downward along the ball nut housing 72 until the lip 69b of the face plate 69 presses against the top of the ball nut housing. Thus, movement of the ball nut housing 72 along the vertical screw 74 generally causes corresponding movement of the carriage attachment assembly 68, and of the carriage assembly 48 attached thereto.

When another object supports the weight of the truss 24, the ball nut housing 72 can slide downward in the carriage attachment assembly 68. For example, when the machine 20 lowers the truss 24 towards another structure, downward movement of the truss will be stopped when the truss impacts this structure. However, the ball nut housing 72 can continue to move downward because the ball nut housing is vertically slidable between the side support members 70 of the carriage attachment assembly 68. Thus, the maximum force the machine 20 can press the truss 24 downward against another structure, is approximately the weight of the truss, plus any weight other objects exert downward against the structure, such as a jig 22. This arrangement serves to prevent damage to equipment, such as the truss 24, a mandrel 30, jig 22, or other structures.

A limit switch 71a is attached to the lip 69b above the ball nut housing 72 as shown in FIG. 7. If the ball nut housing 72 slides downward beyond a predetermined level in the carriage attachment assembly 68, the limit switch 71a is activated. Preferably, approximately one inch of downward movement of the ball nut housing 72 relative to the carriage attachment assembly 68 activates the limit switch 71a. The control station 27 monitors the output from the limit switch 71a, and stops movement of the ball nut housing 72 when the limit switch is activated. Thus, the machine 20 stops downward movement of the ball nut housing 72 a short distance after downward movement of the truss 24 and/or carriage assembly 48 has been stopped.

Figure 10:
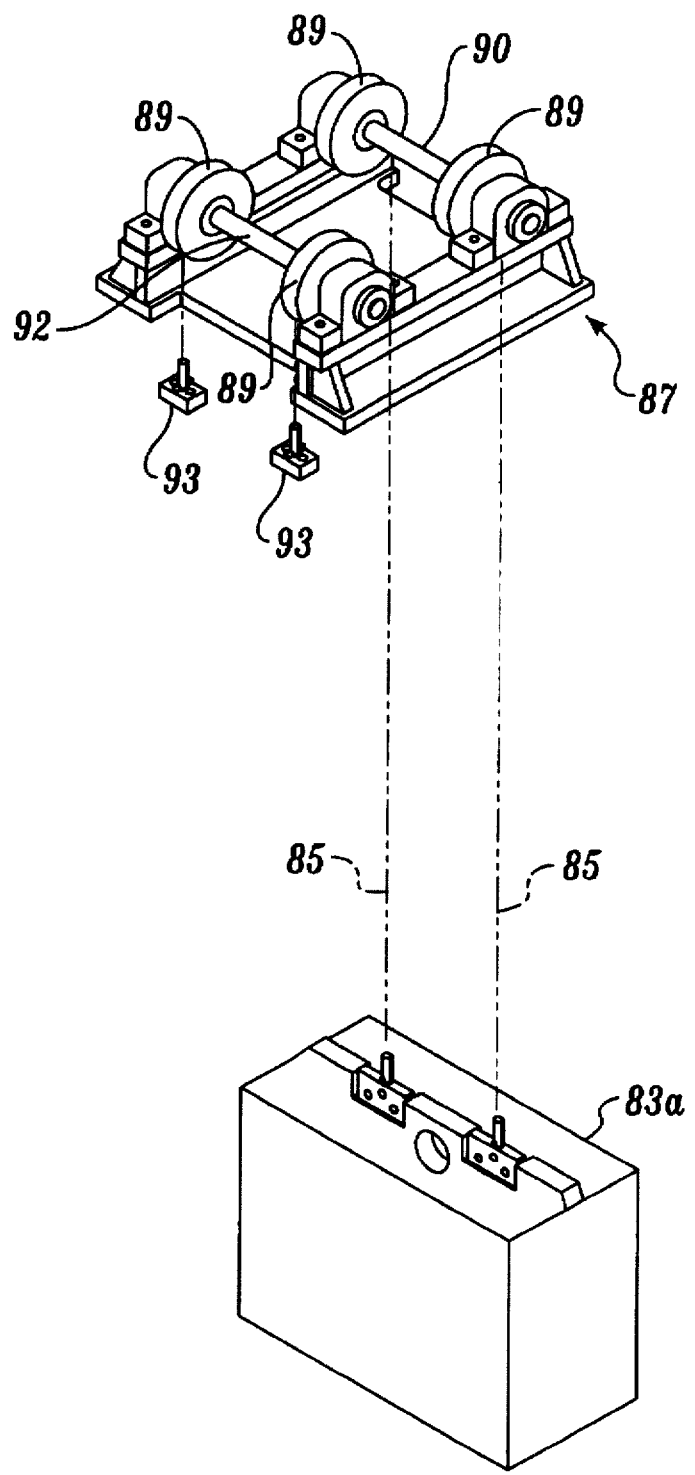
FIG. 10 is a perspective view of the pulley and counter-weight system of the trunnion of FIG. 6.

As shown in FIG. 10, the vertical linear movement assembly 41 also includes a counterweight 83a for countering the weight of the carriage assembly 48. The counterweight 83a is affixed to one end of a pair of cables 85 supported by a pulley assembly 87 mounted atop the tower 43 underneath the cap 45. The counterweight 83a is useful for supporting the weight of the carriage assembly 48 when performing maintenance on a trunnion 26.

The pulley assembly includes four pulleys 89. The pulleys 89 are arranged in pairs, with one pair of pulleys coaxially mounted on a first shaft 90, and the other pair of pulleys coaxially mounted on a second shaft 92. The first and second shafts 90 and 92 lie parallel to one another, with each pulley on a shaft radially aligned with a related pulley on the other shaft.

The pulleys 89 mounted on the first shaft 90 are positioned such that the outer edge of each pulley lies beyond the rear surface of the U-shaped channel 79a that supports the plate 78 that supports the upper end of the screw 74. The pulleys 89 mounted on the second shaft 92 are positioned such that the outer edge of each pulley is approximately tangential with the rear support plate 79 of the carriage assembly 48. The cables 85 are connected to spaced apart locations on the upper edge of the rear support plate 79 by brackets 93, and extend upward to the pulleys 89 mounted on the second shaft 92. From there, the cables 85 extend over the pulleys mounted on the second shaft 92, and then downward to spaced-apart locations on the counterweight 83a.

As the carriage assembly 48 moves vertically up and down as the screw 74 of the ball screw mechanism is rotated, the counterweight 83a moves oppositely, on the reverse side of the ball screw. Preferably, the counterweight 83a includes a plurality of steel weights that approximately equal the weight of the carriage assembly 48. In alternate embodiments, the counterweight 83a could include additional weights to counter the weight of the truss 24, as well as countering the weight of the carriage assembly 48.

As noted previously in connection with FIG. 2, the machine 20 includes a control station 27 for controlling operation of the vertical linear movement assembly 41 and the carriage assembly 48. The control station 27 receives electrical signals from a number of sensors located about the machine 20. The control station 27 uses the information contained in the electrical signals to determine when the various motors used to power the machine have repositioned the various movable elements in response to a reposition command and/or to prevent movement beyond pre-set limits.

In this regard a resolver 124, connected to the shaft of the motor 58 that is used to rotate the shaft 52, transmits electrical pulses when the motor shaft is operated. The control station 27 counts the electrical pulses and uses the resulting information to determine the rotational position of the shaft 52 and, thus, the truss 24 and the jig 22. Since there is a trunnion 26 located at each end of the truss 24, the control station 27 compares the information produced by the resolvers 124 associated with the motors that control the location of shafts 52 located at both ends of the truss. The control station 27 uses the comparison information to ensure that both shafts 52 rotate the truss 24 by equal amounts and at equal rates. Preferably, strain gauges (not shown) are connected to the shaft 52 of each of the trunnions 26. The control station 27 monitors the output from the strain gauges to determine whether the torque applied to the shafts exceeds a maximum level. If so, the control station 27 commands the motors 58 to cease operation, and an alert is provided to personnel monitoring the control station. The control station 27 also commands the motors 58 to cease operation if the shafts 52 of the trunnions 26 are incurring significantly unequal levels of torque, and an alert is provided to operating personnel.

As noted previously, a resolver 76a is connected to the upper end of the vertically oriented screw 74 of each trunnion 26. Additionally, the motors 64 at the base of each trunnion 26 include resolvers 126. The resolvers 76a and 126 produce pulses as the shafts of the motors 64 and the screws 74, respectively rotate. The control station 27 monitors the output from the resolvers 76a and 126 and uses the information to determine the height of each end of the truss 24 and, thus, the jig 22. The control station 27 uses the height information to ensure that each trunnion raises and lowers its respective carriage assembly 48, and thus the truss and jig, approximately equal amounts. Preferably, linear displacement transducers (not shown) are also connected to each of the carriage assemblies 48 to provide additional information as to the vertical position of the carriage assemblies and, thus, the truss and jig. In one actual embodiment of the present invention, linear displacement transducers sold under the trade name TEMPOSONICS II, and manufactured by the Sensors Division of MTS Systems Corporation of Research Triangle Park, N.C., were found suitable.

If desired, a scale can be provided on the tower 43 of each trunnion 26 to allow an operator to manually align the carriage assemblies 48 with one another. That is, a visual scale allows personnel to individually operate the motor 64 at the base of each trunnion 26 to manually align the carriage assemblies 48 with one another.

Referring to FIG. 6, preferably, a limit switch 128 is positioned near each opposite end of the tower 43 of each trunnion 26. The control station 27 monitors the output from the limit switches 128 to ensure that neither carriage assembly 48 is raised or lowered beyond predetermined limits.

Resolvers (not shown) are also preferably connected to each motor 82 (see FIG. 11) that is used to translate the shaft 52 along the axis of rotation of the truss 24. The control station 27 monitors the output of these resolvers to determine how far each shaft 52 of the trunnion 26 is translated towards, or away from the other trunnion.

As shown in FIG. 11, preferably a limit switch 130 is mounted on the upper side of the upper plate 117 that join the slide brackets 112 of the carriage assembly 48. When the carriage assembly 48 is translated horizontally, the limit switch 130 is activated by ramps 132 mounted on the rear support plate 79 and positioned at either end of the maximum acceptable range of horizontal carriage assembly motion. The control station 27 monitors the output from the limit switch 130 to ensure that the carriage assembly 48 is not horizontally translated beyond acceptable limits by the motor 82.

While the preferred embodiment of the invention has been illustrated and described, it will be appreciated that within the scope of the appended claims, various changes can be made therein without departing from the spirit and scope of the invention.

The embodiments of the invention in which an exclusive property or privilege is claimed are defined as follows:

1. A system for aligning a first composite part relative to a second composite part, comprising:
   (a) a jig for supporting a first composite part, the jig having a plurality of alignment pins projecting therefrom;
   (b) a mandrel for supporting a second composite part, the mandrel having a plurality of alignment holes for receiving the alignment pins;
   (c) a truss for supporting the jig, the truss having first and second ends; and
   (d) a first support stand connected to the first end of the truss and a second support stand connected to the second end of the truss for moving the truss toward and away from the mandrel each support stand including first linear movement means, the first linear movement means of the first support stand and the first linear movement means of the second support stand acting on the first and second ends of the truss to move the truss toward and away from said mandrel, said mandrel being mounted for free movement in directions perpendicular to the movement of the truss toward and away from the mandrel by the first linear movement means.

2. The system of claim 1, wherein each support stand also includes rotation means, for rotating the truss along an axis substantially passing through both ends of the truss.

3. The system of claim 2 wherein said first and second support stands also include second linear movement means for moving the truss along a path of travel generally parallel to an axis passing through both ends of the truss.

4. The system of claim 1, wherein the alignment pins are tapered to facilitate receiving the alignment pins in the alignment holes.

5. The system of claim 4, wherein the alignment pins include a base connected to the jig, a tip located opposite the base, and a bulbous protrusion located between the base and the tip for closely aligning the jig with the mandrel.

6. A system for aligning a first composite part relative to a second composite part, comprising:

(a) a jig for supporting a first composite part, the jig having a plurality of alignment pins projecting therefrom;

(b) a mandrel for supporting a second composite part, the mandrel having a plurality of alignment holes for receiving the alignment pins;

(c) a truss for supporting the jig, the truss having first and second ends;

(d) a first support stand connected to the first end of the truss and a second support stand connected to the second end of the truss for moving the truss toward and away from the mandrel each support stand including first linear movement means, the first linear movement means of the first support stand and the first linear movement means of the second support stand acting on the first and second ends of the truss to move the truss toward and away from said mandrel; and (e) second linear movement means, said second linear movement means for moving the truss along a path of travel generally parallel to an axis passing through both ends of the truss.

7. The system of claim 3, wherein the second linear movement means includes:

(a) a ball screw mechanism;

(b) a motor connected to the screw of the ball screw mechanism so as to cause the screw to rotate when the motor is energized; and (c) a coupling mechanism for coupling the ball of the ball screw mechanism to the rotation means.

8. A system for aligning a first composite part relative to a second composite part, comprising:

(a) a jig for supporting a first composite part, the jig having a plurality of alignment pins projecting therefrom;

(b) a mandrel for supporting a second composite part, the mandrel having a plurality of alignment holes for receiving the alignment pins;

(c) a truss for supporting the jig, the truss having first and second ends;

(d) a first support stand connected to the first end of the truss and a second support stand connected to the second end of the truss for moving the truss toward and away from the mandrel each support stand including first linear movement means, the first linear movement means of the first support stand and the first linear movement means of the second support stand acting on the first and second ends of the truss to move the truss toward and away from said mandrel; and (e) rotation means for rotating the truss along an axis substantially passing through both ends of the truss.

9. The system of claim 8, wherein said first and second support stands each include rotation means and wherein the rotation means of each of said first and second support stands includes:

(a) a shaft;

(b) a coupling mechanism for coupling the shall to a related end of the truss; and (c) a motor connected to the shaft for causing rotation of the shaft.

10. The system of claim 6, wherein the first linear movement means includes:

(a) a ball screw mechanism;

(b) a motor connected to the screw of the ball screw mechanism so as to cause the screw to rotate when the motor is energized; and (c) a coupling mechanism for coupling the ball of the ball screw mechanism to the rotation means.

* * * * *

UNITED STATES PATENT AND TRADEMARK OFFICE
CERTIFICATE OF CORRECTION

PATENT NO. : 5,701,651
DATED : December 30, 1997
INVENTOR(S) : O.J. Groves et al.

It is certified that error appears in the above-indentified patent and that said Letters Patent is hereby corrected as shown below:

| COLUMN | LINE | |
|---|---|---|
| 14 (Claim 9, | 25 line 6) | "shall" should read --shaft-- |
| 14 (Claim 10, | 29 line 1) | "of claim 6," should read --of claim 1,-- |

Signed and Sealed this

Twenty-fourth Day of March, 1998

Attest:

BRUCE LEHMAN

*Attesting Officer*  *Commissioner of Patents and Trademarks*